F. L. BIXBY.
SIGNAL APPARATUS FOR AUTOMOBILES.
APPLICATION FILED MAR. 13, 1916.
1,198,517.
Patented Sept. 19, 1916.
3 SHEETS—SHEET 2.
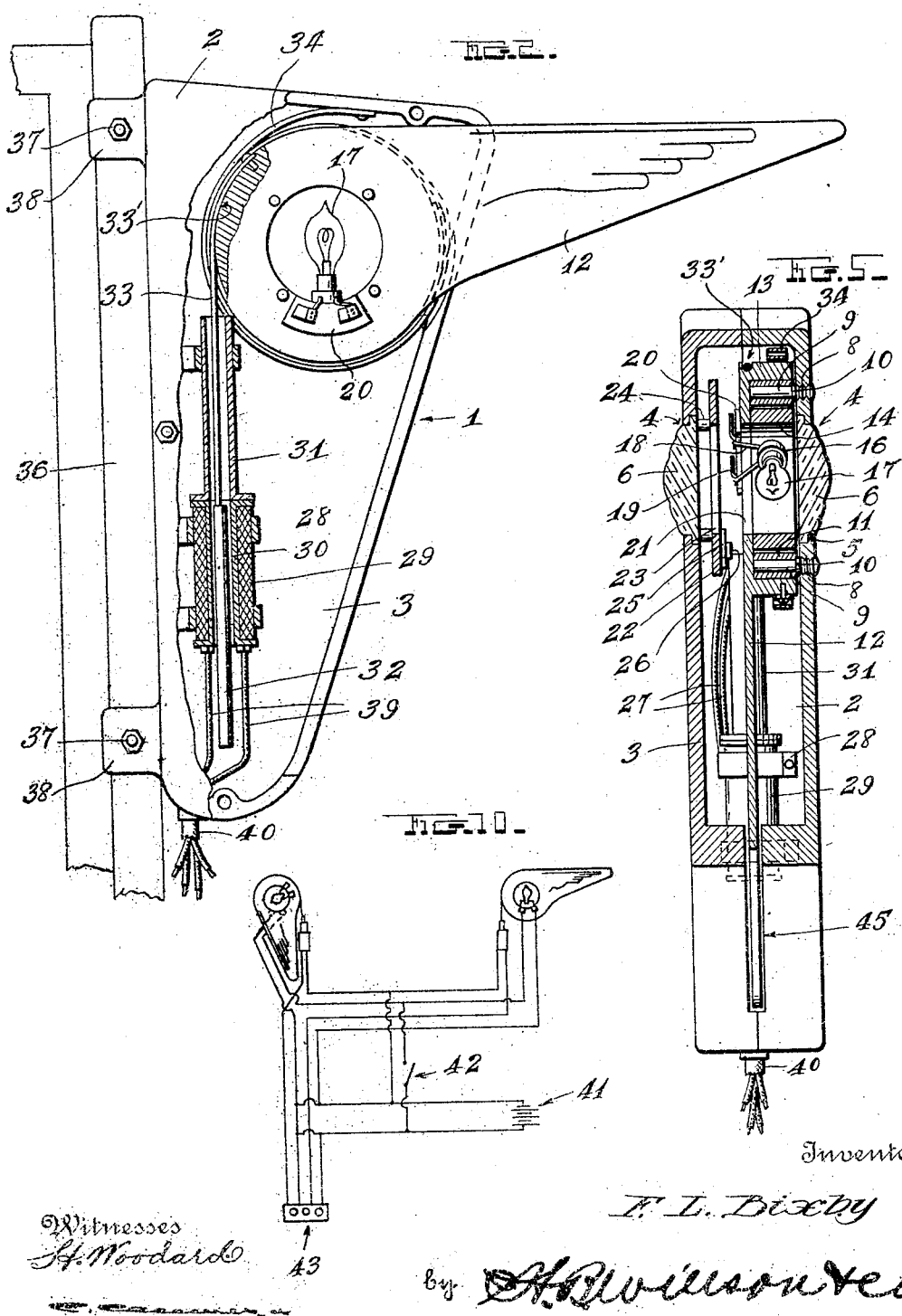

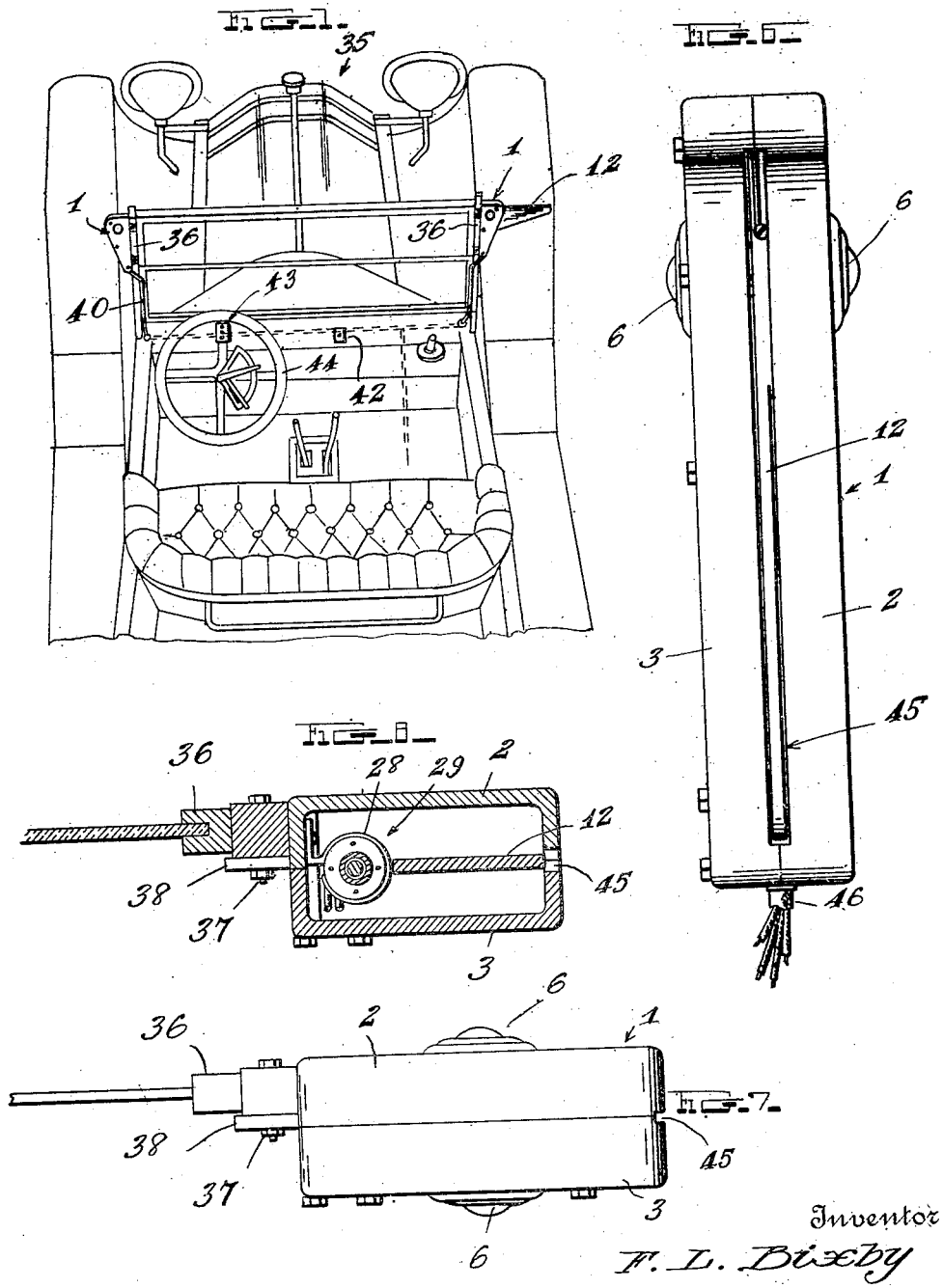

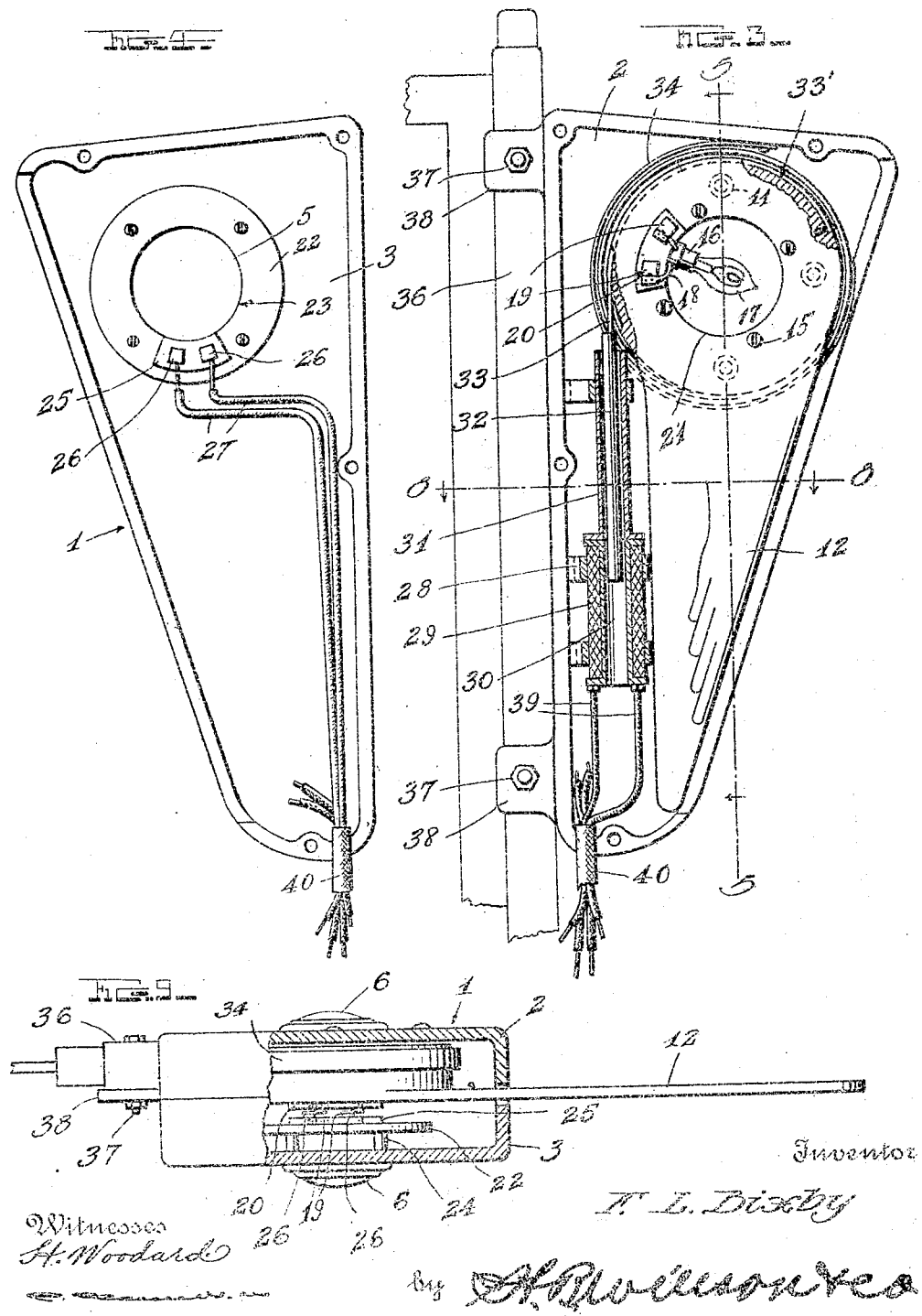

UNITED STATES PATENT OFFICE.

FREDERICK L. BIXBY, OF STATE COLLEGE, NEW MEXICO.

SIGNAL APPARATUS FOR AUTOMOBILES.

1,198,517.  Specification of Letters Patent.  Patented Sept. 19, 1916.

Application filed March 13, 1916. Serial No. 83,907.

*To all whom it may concern:*

Be it known that I, FREDERICK L. BIXBY, a citizen of the United States, residing at State College, in the county of Dona Ana and State of New Mexico, have invented certain new and useful Improvements in Signal Apparatus for Automobiles; and I do declare the following to be a full, clear, and exact description of the invention, such as will enable others skilled in the art to which it appertains to make and use the same.

This invention relates to signal devices designed for use on automobiles and other moving vehicles, and the object thereof is to enable the driver to give notice to the car behind or persons in front whenever he intends to stop or turn, without necessitating removal of the driver's hands from the brakes or steering gear when the operation of stopping or turning is to be effected.

Further objects of the invention are to provide novel and improved apparatus of the class described which is adapted for both day and night service, is simple in construction, comparatively inexpensive, easily applied to existing vehicles, economical to install and maintain, easy to operate, convenient to use, attractive in appearance and effective in action.

Other objects and advantages of the invention will be apparent to those skilled in the art from a consideration of the following description of the perfected form of the apparatus embodying it, taken in connection with the accompanying drawings in which similar reference characters designate like parts throughout the several views and in which:—

Figure 1 is a top plan perspective view of a portion of an automobile showing the application of this invention thereto; Fig. 2 is a front elevation, partly in section, of one of the signal devices showing the semaphore arm thereof in its raised position; Fig. 3 is a front elevation of the interior side of the front section of the casing; Fig. 4 is a similar view of the rear section of the casing; Fig. 5 is a vertical sectional view taken on the plane of the line 5—5 of Fig. 3; Fig. 6 is a side elevation of one of the casings; Fig. 7 is a top plan view of the same showing the semaphore arm in its lowered position; Fig. 8 is a horizontal sectional view taken on the plane of the line 8—8 of Fig. 3; Fig. 9 is a top plan view, partly in section, of one of the sections, showing the semaphore arm in raised position; and Fig. 10 is a diagrammatic representation of the wiring of the automobile.

Referring more particularly to the drawings, the reference numeral 1 represents a substantially triangular shaped housing or casing, which is made preferably of pressed steel or cast aluminum, and which is composed of a rear section 2 and a front section 3. The sides of the sections 2 and 3 near their upper ends are provided with alined light displaying windows 4, each comprising an opening 5 having secured therein in any suitable manner a lens 6, the latter being preferably red in color. These sections 2 and 3 are clamped together by suitable bolts 7.

Adjacent the opening 5 in the rear section 2 of the casing are threaded apertures 8 which receive the threaded ends of pins 9, the inner portions of the latter being reduced in diameter to provide suitable shoulders 10, and revolubly mounted on the inner portions of the pins 9 and resting against the shoulders 10 are suitable rollers 11.

Arranged within the casing 1 is a substantially triangular shaped semaphore arm 12, one end of which is provided with an annular laterally extending flange 13, the latter being revolubly mounted around the rollers 11 as clearly shown in Fig. 5 of the drawings. As shown in Fig. 5 of the drawings this flange 13 is integral with the semaphore arm 12. Arranged on the inside of the rollers 11 and bearing slightly upon the same is a second flange 14, the latter being secured to the adjacent side of the arm 12 by suitable bolts 15 and arranged concentrically with the flange 13. Extending laterally from the interior side of this flange 14 is a suitable lamp socket 16 into which is threaded a small electric lamp 17, and leading from the lamp socket 16 are suitable conductors 18, the free ends of which are connected with contact members 19 arranged on an arcuate insulating plate 20, the latter being secured to the inner side of the pivoted end of the semaphore arm 12. The pivoted end of this semaphore arm 12 is provided with an opening 21 arranged in alinement with the aforesaid light displaying windows 4, and as clearly shown in Fig. 3 of the drawings. The lamp 17 is also arranged in alinement with these windows.

Secured to the interior side of the front section 3 of the casing opposite the light displaying windows 4 therein is a plate 22, the latter being provided with a central opening 23 therein and spaced from the casing by suitable members 24. This plate 22 is provided at its lower edge with an insulating plate 25 to which are attached a pair of stationary contacts 26 for coöperation with the aforesaid contacts 19 in a manner to be hereinafter described. Extending from the contacts 26 are conductors 27.

Secured by suitable brackets 28 to the rear section 2 of the casing is a solenoid 29, the latter being provided with a tubular brass core 30, to the upper end of which is secured in any convenient manner a tubular guide member 31. Slidably mounted in this guide member 31 and extending into the tubular brass core 30 is a soft iron plunger 32, to the upper end of which is connected a flexible element 33, herein shown as being a small wire cable. This flexible cable 33 is passed around the annular flange 13 of the semaphore arm 12, it being received in an annular groove 33' arranged on the outer side of the flange, and is secured at its other end to the latter in any suitable manner. Surrounding the flange 13 is a helical spring 34, the inner end of which is secured to the former, while the outer end of the spring 34 is secured to the upper end of the rear section of the casing as shown.

In use, a pair of the casings 1 are applied to the wind shield of an automobile 35 as shown in Fig. 1 of the drawings, one casing being bolted to each of the upright standards 36 of the wind shield by suitable bolts 37 passing through lugs 38 which extend laterally from the edges of the rear section 2. The wires 27 from the lights 17 together with the wires 39 from the solenoid 29 are collected and passed through a conduit member 40 which is run down the standard 36 in any convenient manner. As shown by Fig. 7 of the drawings the solenoid 29 and the light 17 are energized from an electric battery 41, which may be the ordinary storage battery of the automobile. The lamp circuits are provided with a switch 42 which is arranged preferably on the foot-board of the automobile in order that they may be kept open during the day time, when there would be no utility for using them. The conductors 39 from the solenoid 29 are connected with the contacts of a gang switch 43 which is fixed to the steering wheel 44 of the automobile so that when either one of the semaphore arms 12 and lights 17 are desired to be operated, the driver of the automobile can do so without taking his hands from the steering wheel. This gang switch is provided with three buttons as shown, the outer buttons being so connected with the solenoids 29 that when either one of them is erated. The central button is designed to break the circuit through either or both the solenoids 29 when pressed. This forms no part of the present invention and it is not thought necessary to go into details of the same in the present application.

In operation, the driver of the automobile upon desiring to turn his machine to right or left, pushes the corresponding button of the switch 43. This closes the circuit through the solenoid in the corresponding casing 1 and the plunger 32 is drawn downwardly into the hollow core 30 of the same, and owing to the fact that the upper end of the plunger 32 is connected to the flange 13 by the wire cable the semaphore arm will be swung outwardly, a suitable slot 45 being provided in the adjacent edge of the casing to facilitate its movement. As the arm is swung to its extended position the contacts 19 are moved into engagement with the stationary contacts 26 carried by the plate 22. This closes the circuit through the lights 17. When the turn is made the driver pushes the central button of the switch, thus opening the circuit through the solenoid and allowing the arm to be moved to its normal position under the tension of the spring 34. This movement as will be readily understood also breaks the circuit through the lights.

From the foregoing description taken in connection with the accompanying drawings the advantages and operation of the invention will be readily understood without a more extended explanation. It however, is to be understood that numerous changes in the minor details of construction may be resorted to without departing from the principle or sacrificing any of the advantages as set forth in the appended claims.

I claim as my invention:

1. In an apparatus of the class described, the combination of a casing having alined light displaying openings in its opposite sides, a plurality of rollers revolubly mounted within said casing, a semaphore arm normally housed within said casing and having an opening therein in alinement with the first mentioned openings, a pair of concentrically arranged annular flanges extending laterally from one side of said arm adjacent the opening therein, said rollers being disposed between said flanges to pivot said arm, a normally extinguished electric lamp mounted on the inner side of the inner flange and in alinement with said openings, means for lighting said lamp when said arm is actuated, and means for operating said arm to project the free end of the same through said casing.

2. In an apparatus of the class described, the combination of a casing having alined light displaying openings in its opposite within said casing, a plate secured within said casing, said plate and one end of said arm being provided with openings alined with said light displaying openings, a normally extinguished electric lamp arranged within said casing in alinement with said openings, a pair of stationary contacts secured to said plate, an additional pair of contacts secured to said arm and moved into engagement with said stationary contacts for lighting said lamp when said arm is moved out of its normal position, and means for actuating said arm.

In testimony whereof I have hereunto set my hand in presence of two subscribing witnesses.

FREDERICK L. BIXBY.

Witnesses:
B. J. SKINNER,
MAE RICKETSON.